(12) United States Patent
Wu et al.

(10) Patent No.: US 12,178,330 B2
(45) Date of Patent: Dec. 31, 2024

(54) CHILD CARRIER

(71) Applicant: WONDERLAND SWITZERLAND AG, Steinhausen (CH)

(72) Inventors: Bo Wu, Steinhausen (CH); Meifeng Fan, Steinhausen (CH); Wenhao Li, Steinhausen (CH)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 18/500,364

(22) Filed: Nov. 2, 2023

(65) Prior Publication Data
US 2024/0057789 A1    Feb. 22, 2024

Related U.S. Application Data

(63) Continuation of application No. 17/674,331, filed on Feb. 17, 2022, now Pat. No. 11,839,314.

(30) Foreign Application Priority Data

Feb. 18, 2021   (CN) .......................... 202120378940.X (51) Int. Cl.
| | | |
|---|---|---|
| B60N 2/28 | (2006.01) |
| A47D 1/00 | (2006.01) |
| A47D 13/02 | (2006.01) |
| A47D 15/00 | (2006.01) |
| B62B 9/10 | (2006.01) |

(52) U.S. Cl.
CPC ............. *A47D 15/006* (2013.01); *A47D 1/00* (2013.01); *A47D 13/025* (2013.01); *B60N 2/2812* (2013.01); *B62B 9/104* (2013.01)

(58) Field of Classification Search
CPC .......... B60N 2/2812; B60N 2002/2818; A47D 15/006
See application file for complete search history.

(56) References Cited

U.S. PATENT DOCUMENTS

| | | |
|---|---|---|
| 779,279 A | 1/1905 | Hastings |
| 4,402,548 A | 9/1983 | Mason |
| 5,845,967 A | 12/1998 | Kane et al. |

(Continued)

FOREIGN PATENT DOCUMENTS

| | | |
|---|---|---|
| CN | 1263834 A | 8/2000 |
| CN | 1346617 A | 5/2002 |

(Continued)

OTHER PUBLICATIONS

Taiwan Office Action issued in corresponding Taiwan Application No. 11120496350, dated May 19, 2022, pp. 1-18.

(Continued)

*Primary Examiner* — Syed A Islam
(74) *Attorney, Agent, or Firm* — HAUPTMAN HAM, LLP (57) ABSTRACT

A child carrier includes: a seat portion; a buckle movably provided on the seat portion; a backrest portion connected to the seat portion and extending upward, the backrest portion having a plurality of adjustment holes formed therein from bottom to top; and a shoulder strap having a fixed end and a free end, the fixed end being fixed on a rear side of the backrest portion, the free end passing through one of the plurality of adjustment holes and being removably connected to the seat portion.

11 Claims, 9 Drawing Sheets

(56) References Cited

U.S. PATENT DOCUMENTS

| | | | |
|---|---|---|---|
| 6,543,847 B2 | 4/2003 | Balensiefer | |
| 6,659,564 B2 | 12/2003 | Kassai et al. | |
| 6,695,412 B2 * | 2/2004 | Barger | B60N 2/2812 |
| | | | 297/484 |
| 9,192,248 B2 | 11/2015 | Wigzell et al. | |
| 2002/0070593 A1 | 6/2002 | Takayama | |
| 2004/0108758 A1 | 6/2004 | Eastman et al. | |
| 2006/0138826 A1 | 6/2006 | Caton et al. | |
| 2008/0258527 A1 | 10/2008 | Gower et al. | |
| 2009/0309405 A1 | 12/2009 | Maciejczyk | |
| 2020/0383495 A1 | 12/2020 | Sheldrick | |

FOREIGN PATENT DOCUMENTS

| | | |
|---|---|---|
| CN | 101010219 A | 8/2007 |
| CN | 201468701 U | 5/2010 |
| CN | 204055943 U | 12/2014 |
| CN | 204150090 U | 2/2015 |
| CN | 204580651 U | 8/2015 |
| CN | 204908741 U | 12/2015 |
| CN | 209073931 U | 7/2019 |
| CN | 210310528 U | 4/2020 |
| DE | 202020104034 U1 | 7/2020 |
| EP | 1642803 A1 | 4/2006 |
| JP | 1-70659 | 5/1989 |
| JP | 2-107359 | 8/1990 |
| JP | 2002178809 | 6/2002 |
| JP | 2003226172 A | 8/2003 |
| JP | 2006101976 A | 4/2006 |
| JP | 2020163887 A | 10/2020 |
| TW | 201545919 A | 12/2015 |

OTHER PUBLICATIONS

Office Action dated Jan. 23, 2023 from corresponding application No. JLP 2022-022868. (4 pages, English translation 4 pages).

Japanese Notice of Allowance dated Aug. 21, 2023, from corresponding Japanese Application No. 2022-022868. (3 pages, English translation 3 pages).

Taiwan Office Action issued in corresponding Taiwan Application No. 111105213, dated May 19, 2022, pp. 1-18.

Notice of Grant issued in Japanese Patent Application No. 2023-153931, mailed Oct. 28, 2024, 6 pages.

* cited by examiner

CHILD CARRIER

CROSS-REFERENCE OF RELATED APPLICATIONS

This application is a continuation application of U.S. patent application with Ser. No. 17/674,331, entitled, "Child Carrier" filed on Feb. 17, 2022, now allowed, which claims priority to the Chinese Patent Application No. 202120378940.X, filed on Feb. 18, 2021, and entitled "CHILD CARRIER", the entire content of which is incorporated herein in its entirety.

TECHNICAL FIELD

The present disclosure relates to a child carrier.

BACKGROUND

Conventional child carriers, such as child strollers, are usually equipped with seats and backrests. The angles of the backrests relative to the seats are generally adjustable such that children can lean on the backrests at different angles. In addition, restraint systems, such as shoulder straps, are further provided on seats and backrests of the conventional child carriers and are used to restrain children sitting in the child carriers, to ensure safety of the children.

The shoulder straps of the conventional child carriers are generally designed to have one end fixed to a backrest portion and the other end fastened to a buckle of a seat portion. The height of the shoulder strap is often not adjustable. However, as the child grows, the height and width of shoulders of the child may change significantly. If the position and length of the shoulder strap cannot be flexibly adjusted according to the height and body shape of the child, sitting comfort and safety of the child will be affected.

SUMMARY

According to some embodiment, a child carrier is provided, which includes: a seat portion; a buckle movably provided on the seat portion; a backrest portion connected to the seat portion and extending upward, the backrest portion being provided with a plurality of adjustment holes thereon from bottom to top; and a shoulder strap having a fixed end and a free end, the fixed end being fixed on a rear side of the backrest portion, the free end passing through one of the plurality of adjustment holes and being removably connected to the seat portion.

The above description is merely an overview of the technical solutions of this application. In order to understand the technical means of this application more clearly, the detailed description is provided below in combination with embodiments of this application and the drawings.

BRIEF DESCRIPTION OF THE DRAWINGS

To describe the technical solutions in the embodiments of this application more clearly, the following briefly describes accompanying drawings for describing the embodiments. The accompanying drawings in the following description show some embodiments of this application, and a person skilled in the art may derive other drawings according to these accompanying drawings without creative efforts.

DETAILED DESCRIPTION OF THE EMBODIMENTS

For ease of understanding this application, this application is described more comprehensively below with reference to the accompanying drawings. Example embodiments of this application are provided in the accompanying drawings. However, this application may be implemented in many different forms, and is not limited to the embodiments described in this specification. On the contrary, an objective of providing the embodiments is to understand the content disclosed in the present invention more comprehensively.

Unless otherwise defined, meanings of all technical and scientific terms used in the specification are the same as those usually understood by a person skilled in the art to which this application belongs. In this application, terms used in the specification of this application are intended to describe objectives of the specific embodiments, but are not intended to limit this application. The term "and/or" used in this specification includes any and all combinations of one or more related listed items.

Figure 1:
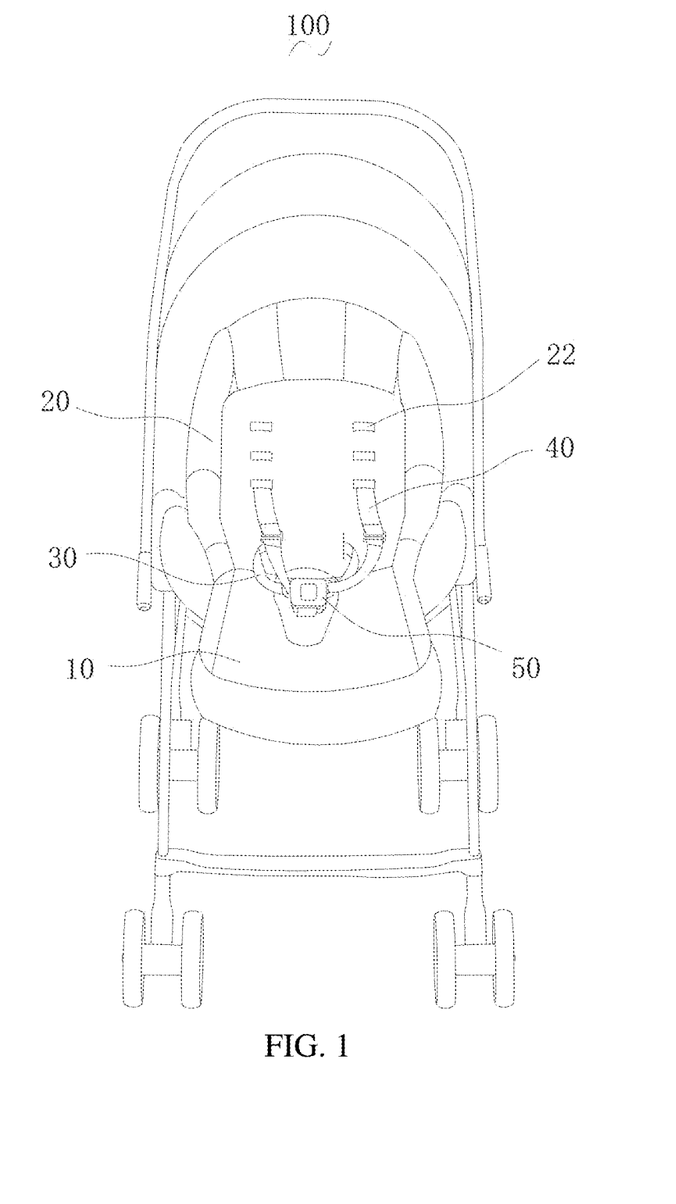
FIG. 1 is a front view of a child carrier in a first state according to an embodiment.
Figure 2:
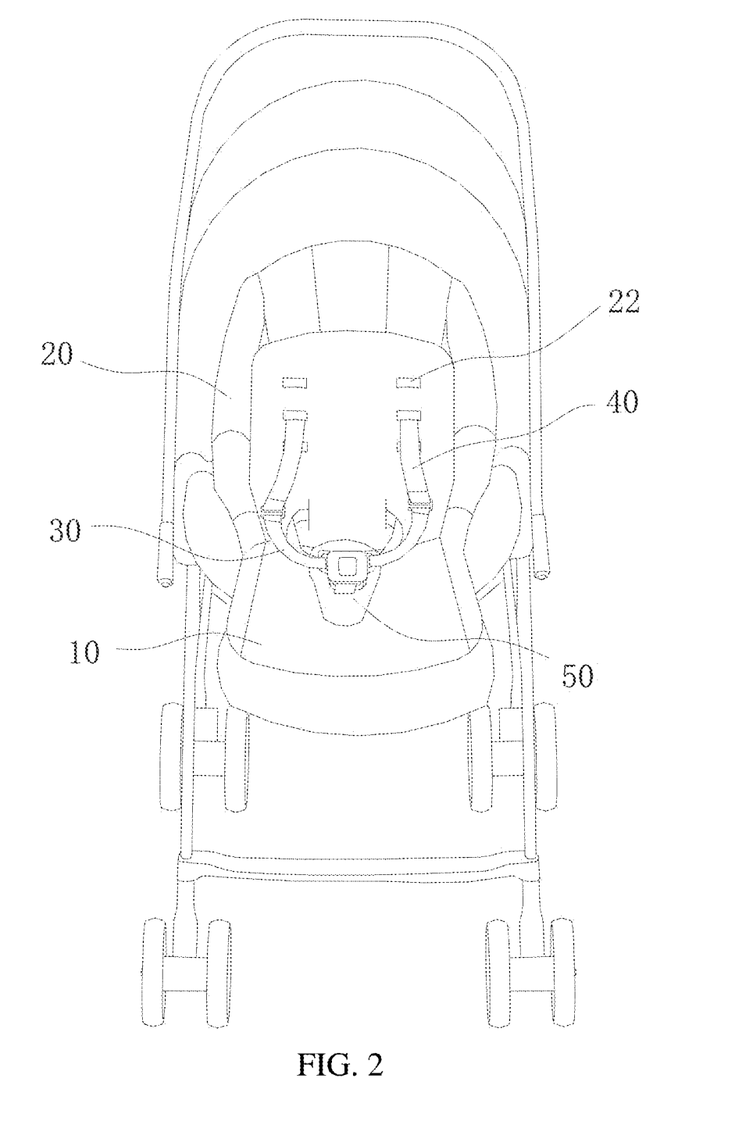
FIG. 2 is a front view of a child carrier in a second state according to an embodiment.

Referring to FIG. 1 and FIG. 2, a child carrier 100 according to a first embodiment includes a seat portion 10, a backrest portion 20, a waist belt 30, a shoulder strap 40, and a buckle 50. In this embodiment, the child carrier 100 is a child stroller. In other embodiments, the child carrier 100 may be a child safety seat, a high chair, a carry cot, or the like.

The seat portion 10 is configured to support the buttocks of a child. The backrest portion 20 is configured to support the back of the child and extends upward with a lower end thereof connected to the seat portion 10. In this embodiment, the seat portion 10 and the backrest portion 20 are separate components, which can be foldably connected together by a hinge mechanism. In other embodiments, the seat portion 10 and the backrest portion 20 may be integrally formed. The backrest portion 20 has a plurality of adjustment holes 22 formed therein from bottom to top. In this embodiment, six adjustment holes 22 are divided into two columns in a horizontal direction, and three adjustment holes 22 in each column are equally spaced apart on the backrest portion 20 along a vertical direction. In some embodiments, the spacing between the adjustment holes 22 in each column can be unequal. A height of the shoulder strap 40 can be conveniently adjusted by arranging the adjustment holes 22 equally spaced apart. It should be understood that a number of adjustment holes 22 is not limited hereto, and may be 4, 8, or more.

Figure 3:
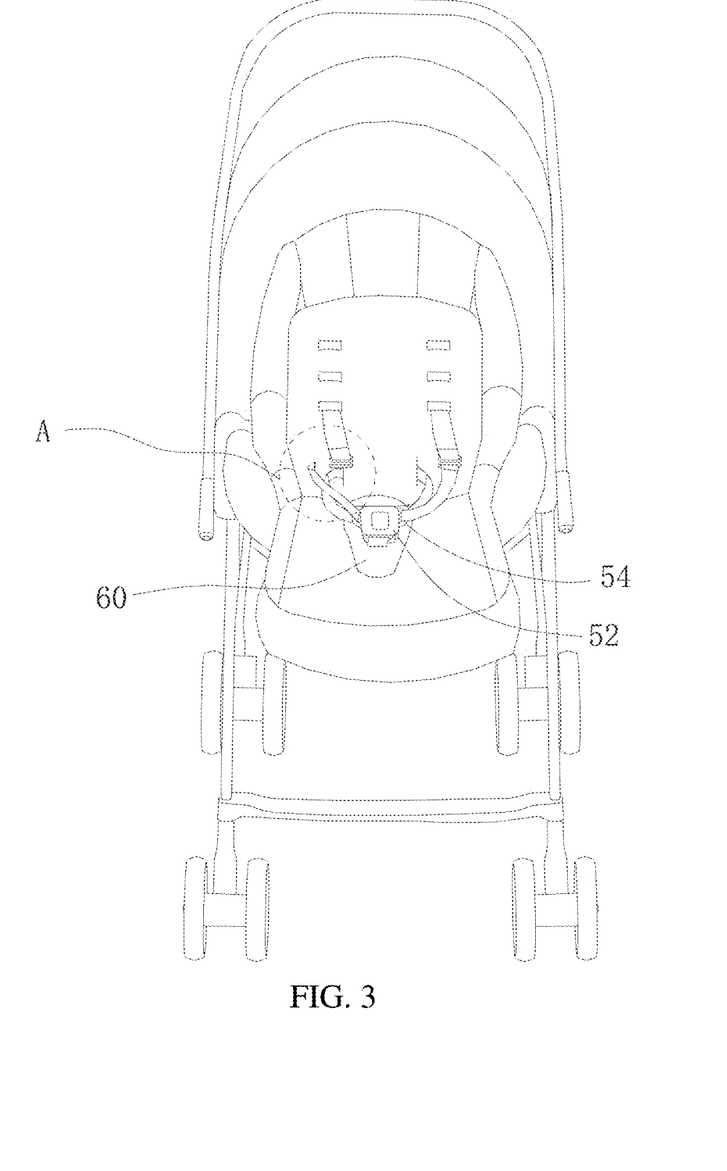
FIG. 3 is a front view of the child carrier shown in FIG. 1 when a shoulder strap and a waist belt of the child carrier are separated.
Figure 4:
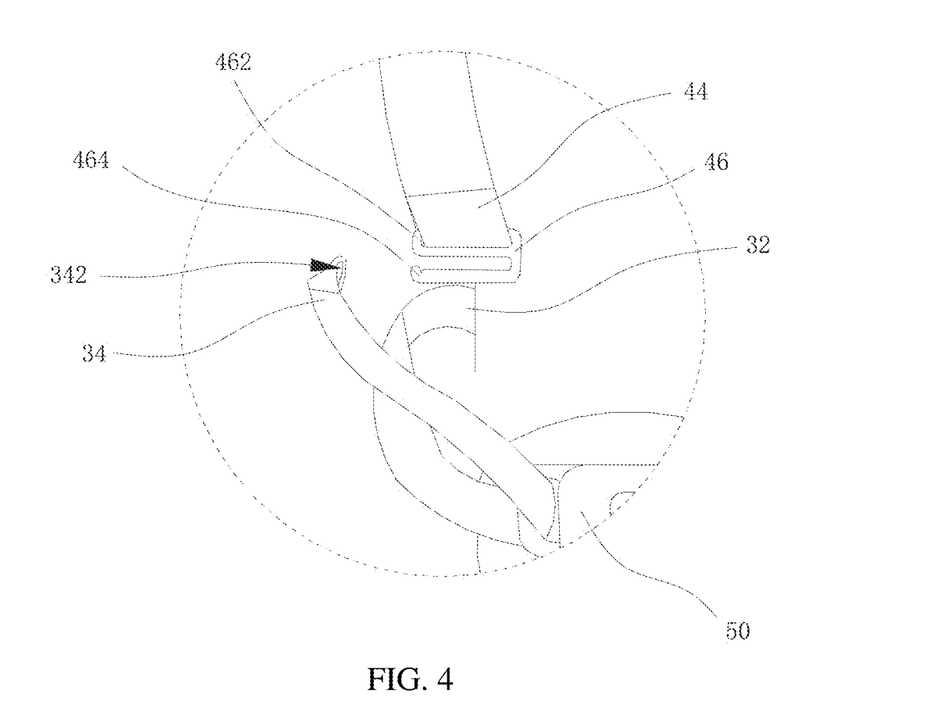
FIG. 4 is a partial enlarged view of a portion A in FIG. 3.

As shown in FIG. 3 and FIG. 4, two waist belts 30 (FIG. 1 and FIG. 2) are provided and are configured to encircle the waist of the child from both sides. The waist belts 30 may be nylon woven belts. Each waist belt 30 includes a first end 32 and a second end 34. The first end 32 is fixed at a corresponding position of the backrest portion 20, and the second end 34 is movably connected to the buckle 50.

Two shoulder straps 40 are provided and are configured to secure the shoulders of the child. The material of the shoulder strap 40 is the same as that of the waist belt 30. In some embodiments, the material of the shoulder strap 40 differs from the material of the waist belt 30. The shoulder strap 40 has a fixed end 42 (FIG. 8) and a free end 44. The fixed end 42 is fixed to a rear side of the backrest portion 20 (see FIG. 8) by sewing or the like. The free end 44 goes through one of the adjustment holes 22 on the backrest portion 20 and is removably connected to the second end 34 of the waist belt 30. As shown in FIG. 3 and FIG. 4, in this embodiment, a first shoulder strap buckle 46 is provided on the free end 44. The first shoulder strap buckle 46 is shaped substantially as a rectangle and includes a rectangular fixing ring 462 and a hook portion 464 extending laterally from a short side of the fixing ring 462. A gap is formed between the hook portion 464 and the fixing ring 462. The free end 44 is fixed on the fixing ring 462 by sewing. A fixing hole 342 is formed at the second end 34 of the waist belt 30 by sewing or the like. The hook portion 464 of the first shoulder strap buckle 46 can be inserted into the fixing hole 342, so as to connect the shoulder strap 40 and the waist belt 30. The hook portion 464 of the first shoulder strap buckle 46 can also be removed from the fixing hole 342, so as to separate the shoulder strap 40 from the waist belt 30. Referring to FIG. 4, to facilitate insertion and removal of the hook portion 464, a diameter of the fixing hole 342 gradually decreases along a direction in which the hook portion 464 is inserted into the fixing hole 342.

The buckle 50 is movably provided on the seat portion 10, and is configured to removably fix the left and right waist belts 30 and the shoulder straps 40 together. In this embodiment, a crotch guard 60 extending between two thighs of the child is provided on the seat portion 10. The buckle 50 is fixed on the crotch guard 60. The crotch guard 60 can prevent the hard buckle 50 from being in direct contact with the child, so as to avoid injury to the child. A width of the crotch guard 60 gradually increases along a direction from a joint between the crotch guard 60 and the seat portion 10 to a position at which the buckle 50 is located, which is more ergonomic. Specifically, the buckle 50 includes a female buckle 52 and a male buckle 54. The female buckle 52 is fixed on the seat portion 10. One end of the male buckle 54 forms a loop that is slidably sleeved on the waist belt 30, and the other end of the male buckle 54 forms a tab that is removably buckled to the female buckle 52. By buckling the male buckle 54 on the waist belt 30 to the female buckle 52 on the crotch guard 60, the shoulder strap 40, the waist belt 30, and the crotch guard 60 are fastened together to implement connection. The joint restraint of the shoulder strap 40, the waist belt 30 and the crotch guard 60 ensures sitting stability and safety of the child in the child carrier 100.

Referring to FIG. 1 through FIG. 3, the working principles of the child carrier 100 with the height-adjustable shoulder strap 40 will be described in greater detail.

During normal use, the fixed ends 42 of the two shoulder straps 40 are fixed on the rear side of the backrest portion 20, and the positions at which the fixed ends 42 are fixed are higher than the uppermost adjustment holes 22. The free ends 44 of the two shoulder straps 40 go through one of the adjustment holes 22 from the rear side of the backrest portion 20 and then are located on a front side of the backrest portion 20. Each free end 44 is then connected to a corresponding second end 34 of the waist belt 30 through a corresponding first shoulder strap buckle 46, thereby connecting the shoulder strap 40 to the waist belt 30. The first end 32 of the waist belt 30 is fixed on the backrest portion 20, and the male buckle 54 movably sleeved on a middle of the waist belt 30 is buckled to the female buckle 52.

When the height of the shoulder strap 40 needs to be adjusted, the hook portion 464 of the first shoulder strap buckle 46 can be taken out from the fixing hole 342, so as to separate the free end 44 of the shoulder strap 40 from the second end 34 of the waist belt 30. Subsequently, the free end 44 of the shoulder strap 40 goes through the current adjustment hole 22 and returns to the rear side of the backrest portion 20. Then, a suitable adjustment hole 22 is selected, and the free end 44 goes through the selected adjustment hole 22 and is then connected to the second end 34 of the waist belt 30 through the first shoulder strap buckle 46, so as to connect the shoulder strap 40 and the waist belt 30.

Compared with the related art, since the plurality of adjustment holes 22 are provided on the backrest portion 20 of the child carrier 100 from bottom to top, the free end 44 of the shoulder strap 40 can selectively go through the adjustment holes 22 at different heights and is connected to the waist belt 30. Since the heights of the adjustment holes 22 are different, the configurations of the shoulder strap 40 can be adjusted according to the height and body shape of a child, thereby improving sitting comfort and safety of the child.

Figure 5:
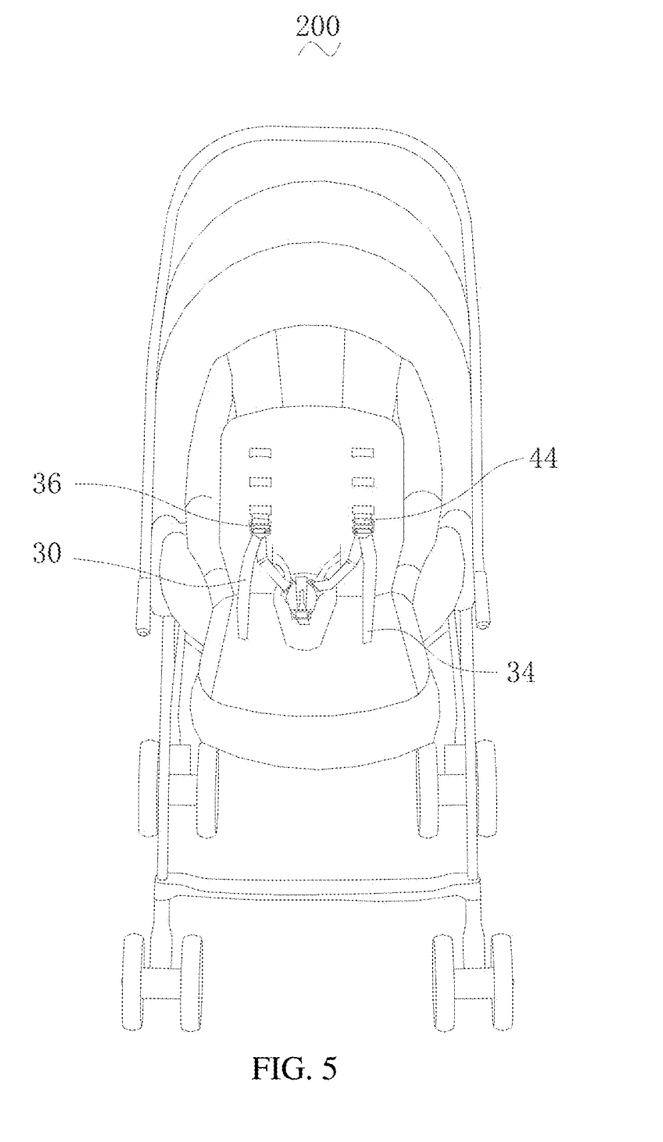
FIG. 5 is a front view of a child carrier according to another embodiment.
Figure 6:
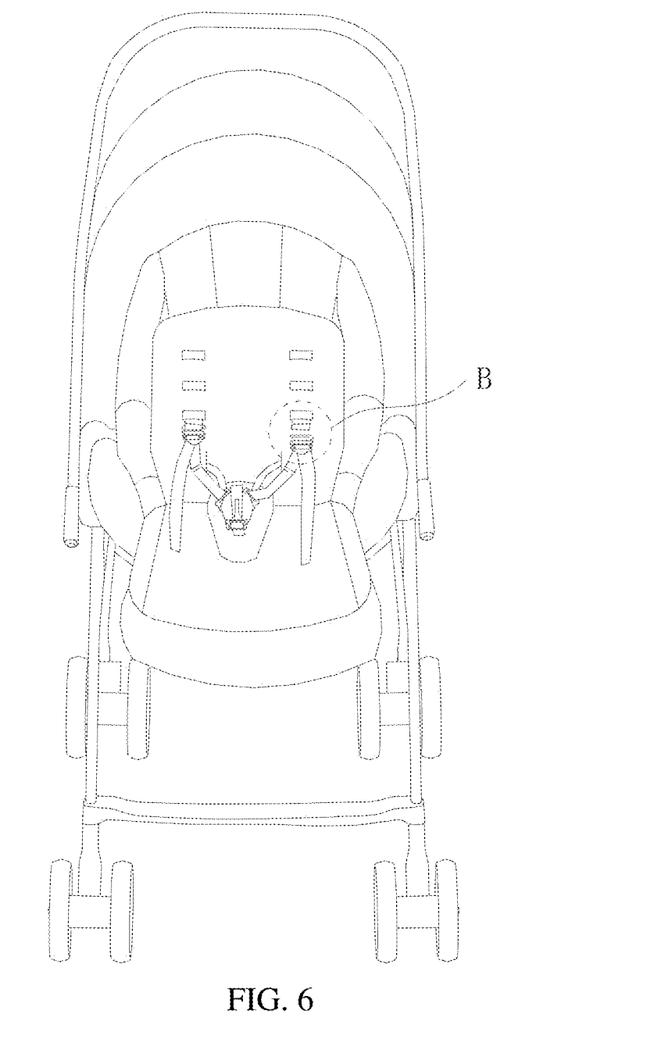
FIG. 6 is a front view of the child carrier shown in FIG. 5 when a shoulder strap and a waist belt of the child carrier are separated.
Figure 7:
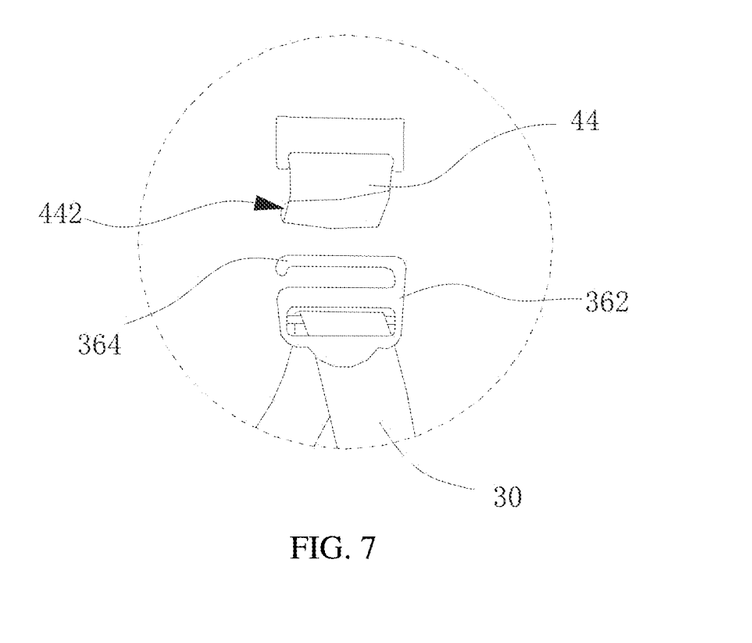
FIG. 7 is a partial enlarged view of a portion B in FIG. 6.

Referring to FIG. 5 through FIG. 7, a child carrier 200 according to a second embodiment is similar to that of the child carrier 100 of the first embodiment. A difference lies in that a second shoulder strap buckle 36 is provided on the waist belt 30, and the free end 44 of the shoulder strap 40 is removably connected to the second shoulder strap buckle 36.

As shown in FIG. 6 and FIG. 7, a fixing hole 442 is formed on the free end 44 of the shoulder strap 40 by sewing or the like. The second shoulder strap buckle 36 includes a main body portion 362 that is shaped substantially as a rectangle, and a hook portion 364 extending laterally from a short side of the main body portion 362. Two elongated holes are provided on the main body portion 362, the second end 34 of the waist belt 30 can go in through one hole and go out through the other hole, such that a position of the second shoulder strap buckle 36 on the waist belt 30 can be conveniently adjusted. A gap is formed between the hook portion 364 and the main body portion 362, such that the hook portion 364 can be removably engaged with the fixing hole 442. Referring to FIG. 7, to facilitate insertion and removal of the hook portion 364, a diameter of the fixing hole 442 gradually decreases along a direction in which the hook portion 364 is inserted into the fixing hole 442.

A usage method of the child carrier 200 according to the second embodiment is similar to that of the child carrier 100 of the first embodiment. The free end 44 of the shoulder strap 40 can selectively go through adjustment holes 22 at different heights, and is connected to the waist belt 30, thereby improving sitting comfort and safety of the child. It should be noted that, because the second shoulder strap buckle 36 is slidably disposed on the waist belt 30, when the shoulder strap 40 goes through the adjustment hole 22 at a lower position, a user can pull the second end 34 of the waist belt 30 to cause the second shoulder strap buckle 36 to move on the waist belt 30 toward the buckle 50, so as to ensure that a length of the waist belt 30 from the adjustment hole 22 to the buckle 50 is not too long, thus avoiding tangling with other straps subject to playing with by the child. That is, the lengths of the waist belt 30 and the shoulder strap 40 bound to the child are tightened, which can meet restraint requirements and ensure sitting safety of the child.

Figure 8:
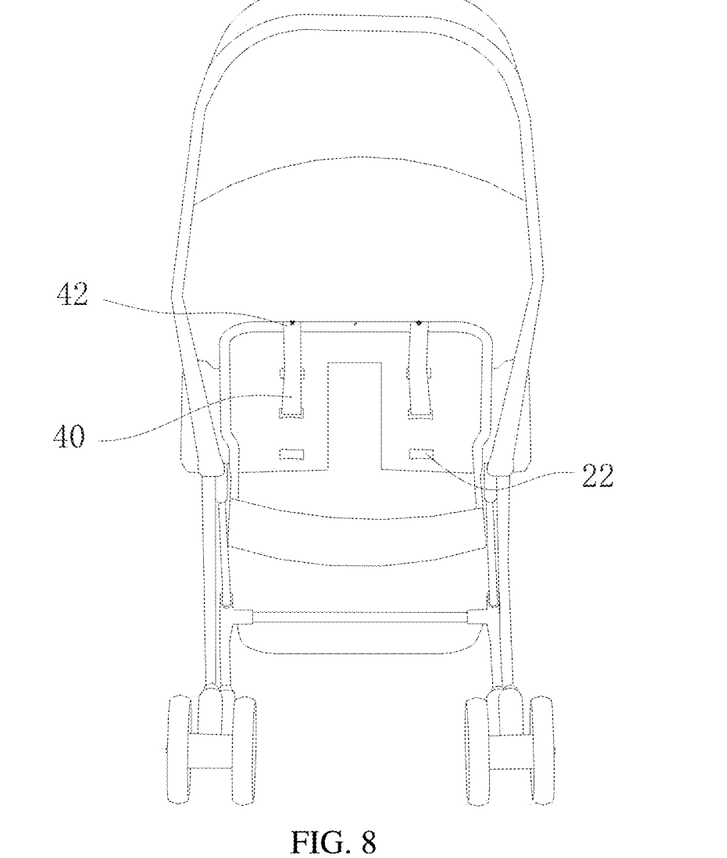
FIG. 8 is a rear view of the child carrier shown in FIG. 2.
Figure 9:
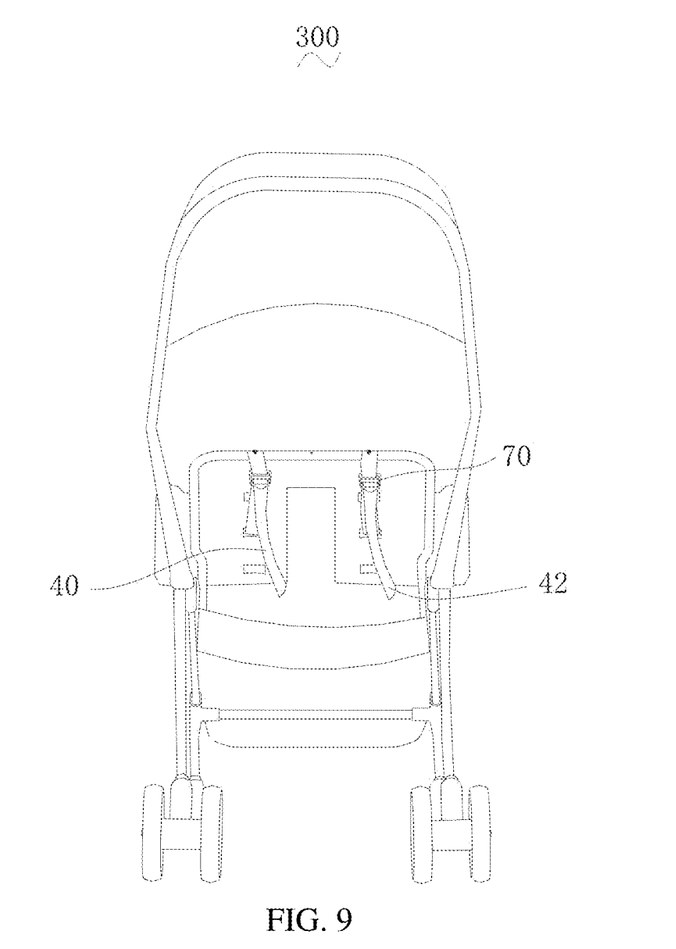
FIG. 9 is a rear view of a child carrier according to another embodiment.

Referring to FIG. 9, the structure of a child carrier 300 according to a third embodiment is similar to that of the child carrier 100 of the first embodiment. A difference lies in that the fixed end 42 of the shoulder strap 40 of the child carrier 100 is fixed on the rear side of the backrest portion 20 as shown in FIG. 8, however the fixed end 42 of the shoulder strap 40 of the child carrier 300 is adjustably connected to the rear side of the backrest portion 20 through a third shoulder strap buckle 70 as shown in FIG. 9.

The third shoulder strap buckle 70 is fixed on the rear side of the backrest portion 20 through a short strap. The third shoulder strap buckle 70 is shaped substantially as that of the main body portion 362 of the second shoulder strap buckle 36. Two elongated holes are provided on the third shoulder strap buckle 70. The fixed end 42 of the shoulder strap 40 can go in through one hole and go out through the other hole, such that a position of the third shoulder strap buckle 70 on the shoulder strap 40 can be conveniently adjusted.

Since the third shoulder strap buckle 70 is slidably disposed on the shoulder strap 40, when the shoulder strap 40 goes through the adjustment hole 22 at a higher position, the user can pull the fixed end 42 of the shoulder strap 40 to cause the extra shoulder strap 40 to go through the third shoulder strap buckle 70, so as to ensure that a length of the shoulder strap 40 from the adjustment hole 22 to the buckle 50 is not too long. That is, the length of the shoulder strap 40 bound to the child is tightened, which can meet restraint requirements and ensure sitting safety of the child.

Although the respective embodiments have been described one by one, it shall be appreciated that the respective embodiments will not be isolated. Those skilled in the art will appreciate upon reading the disclosure of this application that the respective technical features involved in the respective embodiments can be combined between the respective embodiments as long as they have no collision with each other. Of course, the respective technical features mentioned in the same embodiment can also be combined as long as they have no collision with each other.

The foregoing descriptions are specific embodiments of the present invention and are not intended to limit the protection scope of the present invention. Any variation or replacement readily figured out by a person skilled in the art within the technical scope disclosed in the present invention shall all fall within the protection scope of the present invention. Therefore, the protection scope of the present invention shall be subject to the protection scope of the appended claims.

What is claimed is:

1. A child carrier, comprising:
   a seat portion;
   a buckle movably provided on the seat portion;
   a backrest portion connected to the seat portion and extending upward, the backrest portion having a plurality of adjustment holes formed therein from bottom to top;
   a shoulder strap having a fixed end and a free end, the fixed end being fixed on a rear side of the backrest portion, the free end going through one of the plurality of adjustment holes and being removably connected to the seat portion;
   a waist belt, wherein the waist belt comprises a first end fixed to the backrest portion and a second end movably connected to the buckle; and
   a shoulder strap buckle located on the waist belt, wherein the free end has a fixing hole formed therein, and the shoulder strap buckle comprises a hook portion removably engaged with the fixing hole of the free end;
   wherein the shoulder strap buckle slides adjustably on the waist belt.

2. The child carrier according to claim 1, wherein a diameter of the fixing hole gradually decreases along a direction in which the hook portion is inserted into the fixing hole.

3. The child carrier according to claim 1, wherein a third shoulder strap buckle is provided on the rear side of the backrest portion, and the fixed end is adjustably engaged with the third shoulder strap buckle.

4. The child carrier according to claim 1, wherein the buckle comprises a female buckle located on the seat portion and a male buckle located on the waist belt, the male buckle and the female buckle are removably buckled to each other.

5. The child carrier according to claim 1, further comprising a crotch guard movably connected to the seat portion, wherein the buckle is fixed on the crotch guard, and a width of the crotch guard gradually increases along a direction from a joint between the crotch guard and the seat portion to a position at which the buckle is located.

6. The child carrier according to claim 1, wherein the plurality of adjustment holes are arranged in two columns, and the plurality of adjustment holes in each column are equally spaced apart from each other.

7. The child carrier according to claim 1, wherein the child carrier is a child stroller, a car safety seat, a high chair, or a carry cot.

8. The child carrier according to claim 1, wherein a hinge connects the backrest portion with the seat portion.

9. The child carrier according to claim 1, wherein the backrest portion and the seat portion are integrally formed.

10. A child carrier, comprising:
    a seat portion and a backrest portion connected to each other at an angle, the backrest portion extending away from the seat portion and a plurality of adjustment holes formed in the backrest portion;
    a buckle movably provided on the seat portion;
    a shoulder strap having a fixed end and a free end, the fixed end being fixed on a rear side of the backrest portion, the shoulder strap passing through an adjustment hole of the plurality of adjustment holes and being removably connected to the seat portion;
    a waist belt, wherein the waist belt has a first end fixed to the backrest portion and a second end movably connected to the buckle; and
    a shoulder strap buckle located on the waist belt, wherein the free end has a fixing hole formed therein, and the shoulder strap buckle comprises a hook portion removably engaged with the fixing hole of the free end;
    wherein the shoulder strap buckle slides adjustably on the waist belt.

11. The child carrier according to claim 10, wherein a diameter of the fixing hole gradually decreases along a direction in which the hook portion is inserted into the fixing hole.

* * * * *